March 26, 1957 G. E. E. LAMMERZ 2,786,365
THREE SPEED TRANSMISSION
Filed Aug. 14, 1952
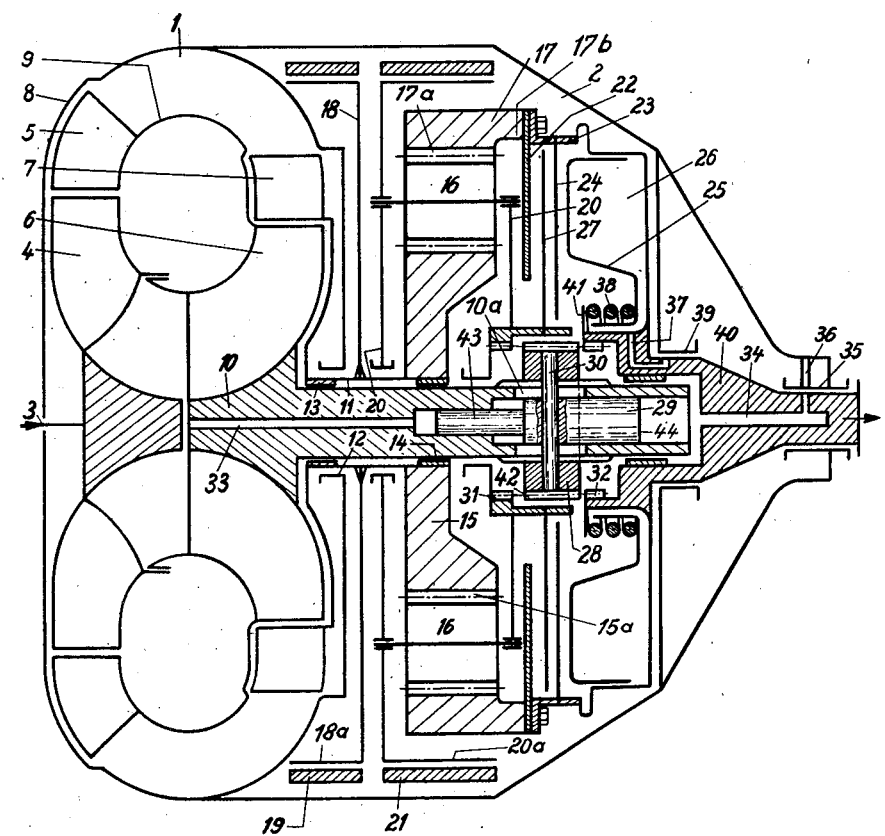
Inventor:
G. E. Ernst Lammerz

United States Patent Office 2,786,365
Patented Mar. 26, 1957

2,786,365

THREE SPEED TRANSMISSION

G. E. Ernst Lammerz, Essen, Germany, assignor to Aktiengesellschaft fur Unternehmungen der Eisen- und Stahlindustrie, Essen, Germany Application August 14, 1952, Serial No. 304,407

Claims priority, application Germany August 24, 1951

6 Claims. (Cl. 74—677)

The present invention relates to multiple speed power transmissions, particularly for use in connection with rail vehicles. More specifically, the invention is directed to a three speed transmission that includes a planetary gear transmission and a hydraulic turbo torque converter preceding said planetary gear transmission and comprising a main turbine which revolves in the direction of rotation of the pumping wheel or impeller of the turbo torque converter, said torque converter also comprising a guide or reaction member adapted selectively to be operated as stationary guiding apparatus or as counter-running turbine.

In numerous cases involving a drive, the usable range of the torque conversion of a hydraulic turbo torque converter consisting of pumping wheel, turbine wheel and guide wheel does not suffice to effect the torque conversion by a turbo torque converter alone. First of all, when driving rail vehicles, the converter range of a turbo torque converter has proved far too narrow to be able by means of a torque converter alone to meet the rather different torque requirements between the starting and the maximum speed. Therefore, it has been necessary to enlarge the torque conversion by subsequently arranging further turbo torque converters or hydraulic clutches or by subsequent mechanical transmissions so that the end result was a two speed, three speed, or even four speed transmission. The enlargement becomes all the more necessary the wider the speed range in which the driving is to be carried out continuously at a predetermined minimum degree of efficiency. A driving example with a very wide range of a predetermined degree of efficiency is, for instance, represented by a rail vehicle which in addition to doing line service also has to carry out switching service for a longer period of time.

There are also known three speed transmissions with three turbo circuits which become effective one after another while always one respective turbo circuit is thrown into the power transmission, whereas the two remaining circuits are idling. In this instance, for the lowest velocity range, generally a turbo torque converter is selected, whereas the two subsequent turbo circuits may be represented by hydraulic couplings or hydraulic circuits. The throwing in and taking out of the turbo circuits is respectively effected by filling or emptying the same. This three speed transmission thus comprises three turbo circuits. In addition to these three turbo circuits, there are furthermore required on the turbine shafts at least two pairs of gears which connect the turbines of the circuits with the output shafts of this three speed transmission.

It is further known to connect a turbo torque converter with a subsequent three speed transmission which consists of three pairs of gears. This arrangement, however, requires a relatively large number of control sleeves which additionally have to be provided with special devices in order to allow shifting during travelling, and furthermore requires three pairs of gears.

Finally, it is also known to design a turbo torque converter in such a manner that the guide wheel may selectively be kept stationary or may work as counter-running turbine. When the guide wheel works as counter-running turbine, the counter-running turbine aids the main turbine, and the output of the main turbine and the counter-running turbine is combined through a transmission. The drive then works in such a manner that in the lower velocity range, the counter-running turbine aids the main turbine. When shifting over to the intermediate velocity range, the guide wheel is kept stationary by applying a brake so that the counter-running turbine is made ineffective and only the main turbine of the converter works. A third velocity range may be obtained in this instance by adding either a second turbo circuit, for instance, converter or coupling, or by arranging subsequent to the turbo torque converter a two speed transmission which consists of two pairs of gears or a special planetary gear transmission. Furthermore, in a manner known per se, the third velocity range may be realized by a direct mechanical clutch between the pump and the turbine of the turbo torque converter, for instance, by means of a multiple disc clutch. However, this arrangement has the drawback that the third velocity range is operated without turbo circuit.

It is, therefore, an object of this invention to provide a three speed transmission which will overcome the above mentioned drawbacks.

It is another object of this invention to provide a three speed transmission which will comprise only one turbo circuit and which will make it possible, with a small number of transmitting elements, to convey the output to a single output shaft, while in each of the three velocity ranges the turbo torque converter will be effective.

It is a still further object of this invention to provide a three speed transmission of the type set forth in the preceding paragraphs which will be rather compact, of small size and of correspondingly low weight.

Still another object of this invention consists in the provision of a three speed transmission of the above mentioned type which includes a turbo torque converter, and in which the input and output shafts are in alignment with each other.

It is also an object of this invention to provide a three speed power transmission with a turbo torque converter effective in each of the three speeds, which will neither require overrunning devices nor require friction clutches that have to transmit the full power of the transmission.

These and other objects and advantages of the invention will appear more clearly from the accompanying drawing which diagrammatically illustrates a longitudinal section through a three speed transmission according to the invention.

General arrangement

The object of providing a three speed power transmission with only one turbo circuit which latter is effective in each of the three speeds has been materialized according to this invention by providing and arranging a planetary gear transmission so that in the lowermost velocity range it is drivingly connected with the guide wheel or reaction member working as counter-running turbine and with the output shaft of the three speed transmission. In the intermediate velocity range, the said planetary gear transmission idles, while in the fastest velocity range the said planetary gear transmission is adapted to be operatively connected with the main turbine and the output shaft of the three speed transmission so as to bring about a speed step-up. This arrangement has the advantage that with only one planetary gear transmission and only one turbo circuit, there are obtainable three velocity ranges, while in each velocity range the same turbo torque converter is operative. Furthermore, this arrangement yields a transmission of a relatively small construction and correspondingly low weight which has the additional advantage that the input and output shafts are in alignment with each other. Furthermore, over-running devices which otherwise would be necessary in another velocity range, as for instance free wheeling arrangements, have become superfluous. It is furthermore superfluous to provide within the three speed transmission any friction clutches which have to transmit the full power of the transmission.

According to a further development of the invention, the planetary gear transmission consists of a spur gearing including a sun-wheel with outer teeth and a sun-wheel with inner teeth and at least two satellites and with its spur gears arranged in one plane. This arrangement yields a particularly space-saving construction.

According to a further development of the invention, the control sleeve or gear clutch, which connects the main turbine of the turbo torque converter with the sun-wheel or the planet carrier of the planetary gear transmission, is connected with an adjusting element, which latter is designed as a differential piston adapted to be subjected to and operated by a medium working pressure. Consequently, when in further development of the invention, the differential piston is arranged in the turbine shaft, a structurally simple arrangement is obtained. If, in further development of the invention, a clutch is provided which inter-connects two elements of the planetary gear transmission which clutch is adapted to bring about synchronism between the planetary gear transmission and the main turbine of the turbo torque converter, the connection of the control sleeve with the planet carrier or with the output shaft is materially facilitated. Furthermore, synchronism between the main turbine and the planetary gear transmission is aided when, in further development of the invention, the turbo torque converter is provided with a device adapted to interrupt the power transmission. Finally, a particularly advantageous construction is obtained when the main turbine of the turbo torque converter comprises two blade or vane rings between which the guide wheel is arranged. In this instance, the tendency to decrease the speed of rotation of the driving engine in the lowermost velocity range, is reduced.

*Structural arrangement*

Referring now to the drawing in detail, the main parts of the three speed power transmission are represented by a turbo circuit comprising a turbo torque converter 1, and by a subsequent transmission 2 which comprises a planetary gear transmission. The power to be transmitted is conveyed to the turbo torque converter from the driving engine by means of the pump shaft 3 which simultaneously represents the driving or input shaft of the three speed transmission. Rigidly connected to the pump shaft 3 is the pumping wheel or impeller 4. The turbine wheel of the turbo torque converter 1 has two vane or blade rings 5 and 6 which rotate in the direction of rotation of the pump wheel 4 and which form the main turbine and between which the blading of the guide wheel or reaction member 7 is arranged, which latter is adapted selectively to be operated as stationary guiding device or as counter-running turbine. The blade rings 5, 6 and guide wheel 7 are surrounded by a stationary casing 8. The blade rings 5 and 6 are interconnected by the inner wall 9. The hub of the blade ring 6 is rigidly connected to the turbine shaft 10. The guide wheel 7 is rigidly connected to the hollow shaft 11 which surrounds the turbine shaft 10. The hollow shaft 11 is by means of the bearing 12 journalled in the casing 8 and furthermore rests at the bearings 14 against the turbine shaft 10. The turbine shaft 10 rests below the bearing 12 at the bearing 13 against the hollow shaft 11. Connected with the hollow shaft 11 is the inner sun-wheel 15 which is provided with an external gear 15a. Meshing with the external gear 15a of the sun-wheel 15 are the satellites 16 which in addition thereto mesh with the inner teeth 17a of the ring-wheel 17. The satellites 16 are journalled in the planet carrier 20 which latter is provided with a flange 20a against which a brake-band 21 may be pressed. Furthermore, rigidly connected with the hollow shaft 11 is a braking disc 18 with a flange 18a against which the brake-band 19 may be pressed. Connected with the ring-wheel 17 is an auxiliary friction clutch designed as plural disc clutch, which is built up in the following manner: Connected with the ring-wheel 17 is a supporting disc 22 and a casing 23 which is in permanent fixed connection with the output shaft 40 of the three speed transmission. For instance, the supporting disc 22 and the casing 23 may be bolted to the flange 17b of the ring-wheel 17, flange 17b protruding in the longitudinal direction of the transmission. The casing 23 is provided with grooves extending in longitudinal direction of the transmission and adapted to receive a disc 24 having grooves on the outside thereof. Arranged between the disc 24 and the supporting disc 22 is a disc 27 having grooves on the inside thereof. The disc 27 is journalled in grooves which extend in the longitudinal direction of the transmission and have been rammed or otherwise worked into the casing of the planet carrier 20. The piston 25 which is guided in the casing 23 may be pressed against the disc 24. That side of the piston 25 which faces the chamber 26 is adapted to be subjected to and operated by oil under pressure. When pressing the piston 25 against the disc 24, the disc 24, disc 27 and the supporting disc 22 are pressed against each other thereby coupling the sun-wheel 17 with the planet carrier 20. On that side of the piston 25 which faces the disc 24 there is provided a spring 36, one end of which rests against the piston 25 whereas the other end of said spring rests against a collar 41 connected to the output shaft 40. When the oil under pressure is discharged from the chamber 26 and thus the pressure acting upon that side of the piston which faces the said chamber is reduced, the spring 38 spaces the piston 25 from the disc 24. In this way the pressure which pressed the disc 24, disc 27 and supporting disc 22 against each other is relieved and the auxiliary clutch between the sun-wheel 17 and the planet carrier 20 is again released. A control sleeve 28 is mounted in a manner known per se on the turbine shaft 10 so that it is movable in longitudinal direction thereto but is non-rotatable relative to said turbine shaft. The connection between the control sleeve 28 and the turbine shaft 10 may be such that tongues in the turbine shaft 10 engage corresponding grooves in the control sleeve 28. The longitudinal movement of the control sleeve 28 on the turbine shaft 10 is effected by a differential piston 29 which is arranged in the interior of the turbine shaft 10. The control sleeve 28 and the differential piston 29 are connected with each other by a pin 30 which penetrates the turbine shaft 10 through slots 10a. The control sleeve 28 is provided with outer teeth 42 adapted to engage inner teeth 32 of the output shaft 40 when the control sleeve is moved in the longitudinal direction of the turbine shaft (toward the right side with regard to the drawing). The outer teeth 42 of the control sleeve 28 are adapted to be brought into meshing engagement with the inner teeth 31 of the planet carrier 20 when the control sleeve 28 is moved in opposite direction (toward the left with regard to the drawing). The front surface of the small piston 43 of the differential piston 29 is continuously subjected to oil under pressure which is admitted from the turbo circuit through a bore 33 in the turbine shaft 10. The front surface of the large piston 44 of the differential piston receives oil under pressure from the bearing 35 through a bore 34 extending through the central portion of the output shaft 40. The bearing 35 is supplied with oil under pressure through a bore 36. Pressure oil is admitted to the chamber 26 through a bore 37 which is arranged in the output shaft 40 and which communicates with the bearing 39. As will be clear from the drawing, the pump shaft 3 which simultaneously represents the input shaft for the three speed transmission, is aligned with the output shaft 40. The feature that the input shaft and the output shaft are aligned with each other is further emphasized in the drawing by arrows.

The operation is as follows: The pumping shaft 3 is driven by any desired driving engine, for instance, an internal combustion engine (not shown in the drawing). In the first or lowermost velocity range, the brake-band 21 is applied so that the planet carrier 20 is held stationary by the braking band. The main turbine with the blade rings 5 and 6 rotates in the direction of rotation of the pumping wheel 4. The small piston 43 of the differential piston 29 is subjected to oil pressure which is received from the turbo circuit through bore 33 and thus moves the control sleeve 28 so that the outer teeth 42 will mesh with the inner teeth 32 of the output shaft 40. As a result thereof, the main turbine through turbine shaft 10, control sleeve 28, and inner teeth 32 directly drives the output shaft 40. The braking-band 19 is not applied. The guide wheel 7, working as counter-running turbine, drives through hollow shaft 11 the inner sun-wheel 15 while the planet carrier 20 is stationary, and also drives the satellites 16 which in turn drive the outer ring-wheel 17 and thus through the casing 23 the output shaft 40. When the blade rings 5 and 6 of the main turbine together yield the quadruple value of the pump torque as starting torque, there will, according to a generally valid law, be obtained at the guide wheel 7, which works as counter-running turbine, the three-fold value of the pump torque in opposite direction of rotation for the starting position. If sun-wheel 15 and satellite 16 are dimensioned so that the ratio of their diameters is approximately 4:1, the transmission between the guide wheel 7 and the output shaft 40 is approximately 1:(—1.5). Thus, on the output shaft a total torque is obtained of $$4+(-3)\times(-1.5)=8.5$$

When the output speed of rotation increases, the peak of efficiency for the range with counter-running turbine is passed. Then the operator switches over to the second or intermediate velocity range. To this end, the brake-band 21 is released, while the brake-band 19 is applied. The guide-wheel 7 and together with the latter the hollow shaft 11 and the sun-wheel 15 are stationary. The blade rings 5 and 6 drive by means of turbine shaft 10 the control sleeve 28 and the inner teeth 32 of the output shaft 40, as was done before. The sun-wheel 17 is carried along by the output shaft 40 through the intervention of the casing 23, in other words, the planetary gear transmission idles.

When the output speed increases, for instance, at a ratio of the speed of rotation of the blade rings of the main turbine to the pumping wheel of 0.75, the peak of efficiency of the intermediate driving range is passed and the operator now switches over to the fast or third velocity range. If at this point a degree of efficiency of transmission is assumed of 0.75 prior to the switching over to the third speed, the turbine now has a torque equalling the pump torque. In order to effect the switching over to the fast velocity range, the brake-bands 19 and 21 are released and that side of the piston 25 which faces the chamber 26 is subjected to oil under pressure which is admitted through bore 37 from the bearing. In view of this oil pressure, the sun-wheel 17 is clutched to the planet carrier 20. The sun-wheel 17 and the planet carrier 20 move synchronically. Now, through bores 36, 34 oil under pressure is admitted which actuates the large piston 44 of the differential piston 29. Due to the action of the oil pressure, the large piston 44 moves the control sleeve 28 toward the left against the force exerted upon the front face of the small piston 43. As a result thereof, the outer teeth 42 engage the inner teeth 31 of the planet carrier 20 while devices known per se may be provided which will secure an easy engagement of the said teeth 42 and 31 with each other. Thereupon, the pressure oil is discharged from the chamber 26 so that the spring 38 brings about a disengagement of the sun-wheel 17 from the planet carrier 20.

After again applying the brake-band 19 so that the guide wheel 7 is held stationary, the main turbine drives the output shaft 40 by means of the turbine shaft 10, the control sleeve 28, the inner teeth 31, the planet carrier 20, the sattellites 16, the sun-wheel 17 and the casing 23. Since, as mentioned, the guide-wheel 7 is held stationary, also the hollow shaft 11 and the sun-wheel 15 are standing still. Thus, between the main turbine and the output shaft 40 there is obtained a speed-up transmission. For instance, taking the dimensions of the sun-wheel 15 and the satellites 16 as mentioned above, a speed-up transmission is obtained at the ratio of 1:1.67. When the torque converter is now operated again throughout its entire range in the manner as described in connection with the intermediate driving range, and assuming a ratio between the speed of rotation of the blade rings of the main turbine and the pumping wheel of 0.75, and assuming a degree of efficiency of, for instance, 0.75, there will again be obtained on the turbine shaft 10 a torque which equals the pump torque. However, the turbine shaft has a ratio of transmission with regard to the output shaft of 1:1.67 so that on the output shaft there will now be obtained a $$\frac{1}{1.67}=0.6 \text{ fold pump torque}$$

Totaling up, there will be obtained within the range from the starting at the first velocity range up to the final speed of rotation in the third velocity range a $$\frac{8.5}{0.6}=14 \text{ fold torque conversion}$$

Any oil leakage originating at the small piston 43 or the large piston 44 of the differential piston 29 will flow along pin 30 and off the turbine shaft 10.

It is, of course, understood that the present invention is, by no means, limited to the particular construction shown in the drawing but also comprises any modifications within the scope of the appended claims.

What I claim is:

1. In combination in a multiple speed power transmission, particularly for rail vehicles: an input shaft; an output shaft; a turbo torque converter including a pump wheel drivingly connected to said input shaft, a turbine wheel, and a guide wheel; a planetary gear transmission interposed between said torque converter and said output shaft and including first gear means in fixed driving connection with said output shaft, second gear means in fixed driving connection with said guide wheel, a planetary gear carrier, and planetary gears carried by said planetary gear carrier and meshing with both said first and said second gear means of said planetary gear transmission; clutch means interposed between said turbine wheel and said planetary gear carrier and movable selectively into a first position for drivingly connecting said turbine wheel with said planetary gear carrier or into a second position for drivingly connecting said turbine wheel with said output shaft; first brake means operable selectively to hold said guide wheel stationary; and second brake means operable selectively to hold said planetary gear carrier stationary independently of said two positions of said clutch means.

2. A power transmission according to claim 1, which includes: a turbine shaft connected to said turbine wheel, sleeve means drivingly connected to said turbine shaft and forming a clutch element of said clutch means; said clutch element being provided with teeth adapted selectively to engage corresponding teeth provided on said planetary gear carrier and said output shaft respectively.

3. In combination in a multiple speed power transmission, particularly for rail vehicles: an input shaft; an output shaft; a turbo torque converter including a circuit for the working fluid, a pump wheel drivingly connected to said input shaft, a turbine wheel, and a guide wheel; a planetary gear system interposed between said torque converter and said output shaft and including first gear means in fixed driving connection with said output shaft, second gear means in fixed driving connection with said guide wheel, a planetary gear carrier, and planetary gears carried by said planetary gear carrier and meshing with both said first and said second gear means; sleeve means rotatably connected to said turbine shaft and movable in longitudinal direction of said turbine shaft; said sleeve means being movable selectively into a first position for drivingly connecting said turbine shaft with said planetary gear carrier or into a second position for drivingly connecting said turbine shaft with said output shaft; first brake means associated with said guide wheel and operable selectively to hold said guide wheel stationary; second brake means associated with said planetary gear carrier and operable selectively to hold said planetary gear carrier stationary independently of said sleeve means occupying said first or second position; a turbine shaft fixedly connected to said turbine wheel; and fluid operable motor means operatively connected with said sleeve means and operable to adjust the same.

4. A power transmission according to claim 3, which includes: bearing means for said output shaft; fluid operable differential plunger means movably mounted within said turbine shaft and operatively connected to said sleeve means for actuating the same; first duct means effecting a continuous communication between the smaller plunger area of said differential plunger means and the circuit of the working fluid of said torque converter; and second duct means effecting communication between the larger plunger area of said differential plunger means and said bearing means and arranged selectively to be supplied with oil under pressure and to convey the same from said bearing means to said larger plunger area thereby actuating said differential plunger means.

5. In combination in a multiple speed power transmission, particularly for rail vehicles: an input shaft; an output shaft; a turbo torque converter including a pump wheel drivingly connected to said input shaft, a turbine wheel, and a guide wheel; a planetary gear transmission interposed between said torque converter and said output shaft and including a planetary gear carrier, planetary gears supported by said planetary gear carrier, a gear ring meshing with said planetary gears and connected to said output shaft, and a sun gear meshing with said planetary gears and being at all times fixedly connected to said guide wheel; a plurality of stop means operable selectively and inedependently of each other to respectively hold said planetary gear carrier and said guide wheel stationary; and coupling means interposed between said turbine wheel and said planetary gear carrier and also between said turbine wheel and said output shaft, said coupling means being movable selectively into a first position for establishing direct driving connection between said turbine wheel and said output shaft and into a second position for establishing driving connection between said turbine wheel and said carrier while interrupting said direct driving connection, one of said stop means being operable to hold said carrier stationary independently of said coupling means occupying its first or second position.

6. A power transmission according to claim 5, which includes auxiliary clutch means having one member drivingly connected to said output shaft and having another member drivingly connected to said planetary gear carrier; and means operable selectively to interconnect said members to thereby interlock said planetary gear carrier and said gear ring of said planetary gear transmission for rotation thereof in synchronism with said turbine wheel and said output shaft.

References Cited in the file of this patent

UNITED STATES PATENTS

| | | |
|---|---|---|
| 2,174,672 | Von Sodon-Fraunhofen | Oct. 3, 1939 |
| 2,293,358 | Pollard | Aug. 18, 1942 |
| 2,368,801 | Carnagua et al. | Feb. 6, 1945 |
| 2,387,398 | Hruska et al. | Oct. 23, 1945 |
| 2,414,359 | Carnagua et al. | Jan. 14, 1947 |
| 2,456,328 | Schneider | Dec. 14, 1948 |
| 2,466,206 | Carnagua | Apr. 5, 1949 |
| 2,512,103 | Hoffman et al. | June 20, 1950 |
| 2,590,472 | Soper et al. | Mar. 25, 1952 |
| 2,606,943 | Evernden | July 22, 1952 |